United States Patent
Candiago et al.

(10) Patent No.: US 12,434,665 B2
(45) Date of Patent: *Oct. 7, 2025

(54) VEHICLE DOOR-OFF FOB SEARCH

(71) Applicant: Ford Global Technologies, LLC, Dearborn, MI (US)

(72) Inventors: Paul Candiago, Windsor (CA); Adithya Ramachandran, Farmington Hills, MI (US); Alejandro Valencia Priego, Rochester Hills, MI (US); Sneha Bagga, Pleasanton, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,234

(22) Filed: May 8, 2024

(65) Prior Publication Data
US 2024/0308467 A1 Sep. 19, 2024

Related U.S. Application Data

(63) Continuation of application No. 17/087,411, filed on Nov. 2, 2020, now Pat. No. 12,005,858.

(51) Int. Cl.
*B60R 25/24* (2013.01)
*B60R 25/10* (2013.01)
*B60R 25/31* (2013.01)
*B60R 25/34* (2013.01)

(52) U.S. Cl.
CPC .............. *B60R 25/24* (2013.01); *B60R 25/10* (2013.01); *B60R 25/31* (2013.01); *B60R 25/34* (2013.01)

(58) Field of Classification Search
CPC ......... B60R 25/24; B60R 25/10; B60R 25/31; B60R 25/34; B60R 16/0231; B60R 25/248

See application file for complete search history.

(56) References Cited

U.S. PATENT DOCUMENTS

| 7,304,255 | B1 * | 12/2007 | Pratt ..................... B60Q 3/80 362/485 |
| 10,641,228 | B2 | 5/2020 | Siddiqui et al. |
| 2011/0068895 | A1 | 3/2011 | Gee et al. |
| 2016/0225203 | A1 | 8/2016 | Asmar et al. |
| 2019/0266821 | A1 * | 8/2019 | Balakrishna .......... B60R 25/245 |
| 2019/0309721 | A1 * | 10/2019 | Siddiqui .............. F02N 11/0833 |

FOREIGN PATENT DOCUMENTS

| CN | 106296881 A | 1/2017 |
| KR | 20200108160 A | 9/2020 |

* cited by examiner

*Primary Examiner* — Dale W Hilgendorf
*Assistant Examiner* — Frank T Glenn, III
(74) *Attorney, Agent, or Firm* — Frank Lollo; Brooks Kushman P.C.

(57) ABSTRACT

A vehicle includes a door sensor, a plurality of transceivers, a display, and one or more controllers. The one or more controllers, responsive to data from the door sensor indicating a corresponding door is absent from the vehicle, command the transceivers to each output a radio frequency signal to determine if a fob is present in the vehicle.

9 Claims, 2 Drawing Sheets

VEHICLE DOOR-OFF FOB SEARCH

CROSS REFERENCE TO RELATED APPLICATION

This application is a continuation of U.S. application Ser. No. 17/087,411, filed Nov. 2, 2020, the disclosure of which is hereby incorporated in its entirety by reference herein.

TECHNICAL FIELD

This disclosure relates to the operation of vehicle passive entry systems.

BACKGROUND

Passive entry passive start systems may provide secure wireless communications that enable a driver to access their vehicle (e.g., unlock their car, start their vehicle) without physically using a key. These systems may use radio frequency signals for authenticating a fob by sending signals between the vehicle and fob.

Passive entry passive start systems may use low-frequency (e.g., 125 kHz, 134 kHz) and ultra-high-frequency (e.g., sub-1 GHz) signals to exchange unique access codes between the fob and vehicle. Once the exchanged codes match expected values and the fob is in the vicinity of the vehicle, the vehicle allows access to the driver.

These systems may also estimate the location of the fob relative to the vehicle—determining whether the fob is inside or outside the vehicle. A series of strategically placed antennas within the vehicle may be sequentially commanded to produce low frequency signals. The fob, in response, may intercept these signals, measure their signal strength, and produce high frequency signals embedding the signal strength data for each of the antennas therein. The vehicle can then interpret this data using known techniques to determine whether the fob is inside or outside the vehicle.

Different types of access may be granted based on the fob location. For example, if the fob is outside the vehicle, then only entry access will be granted but the start function will not be enabled.

SUMMARY

A vehicle includes one or more sensors that detect whether a seat of the vehicle is occupied and whether a door of the vehicle is absent, one or more transceivers, and one or more controllers that, responsive to data from the one or more sensors indicating the seat is not occupied and the door is absent, command the one or more transceivers to output radio frequency signals.

A method includes, responsive to detecting a seat of a vehicle is not occupied and a door of the vehicle is absent, outputting radio frequency signals, and responsive to detecting an absence of any return signal to the radio frequency signals, generating data indicating a key fob is not located in the vehicle.

DETAILED DESCRIPTION

Figure 1:
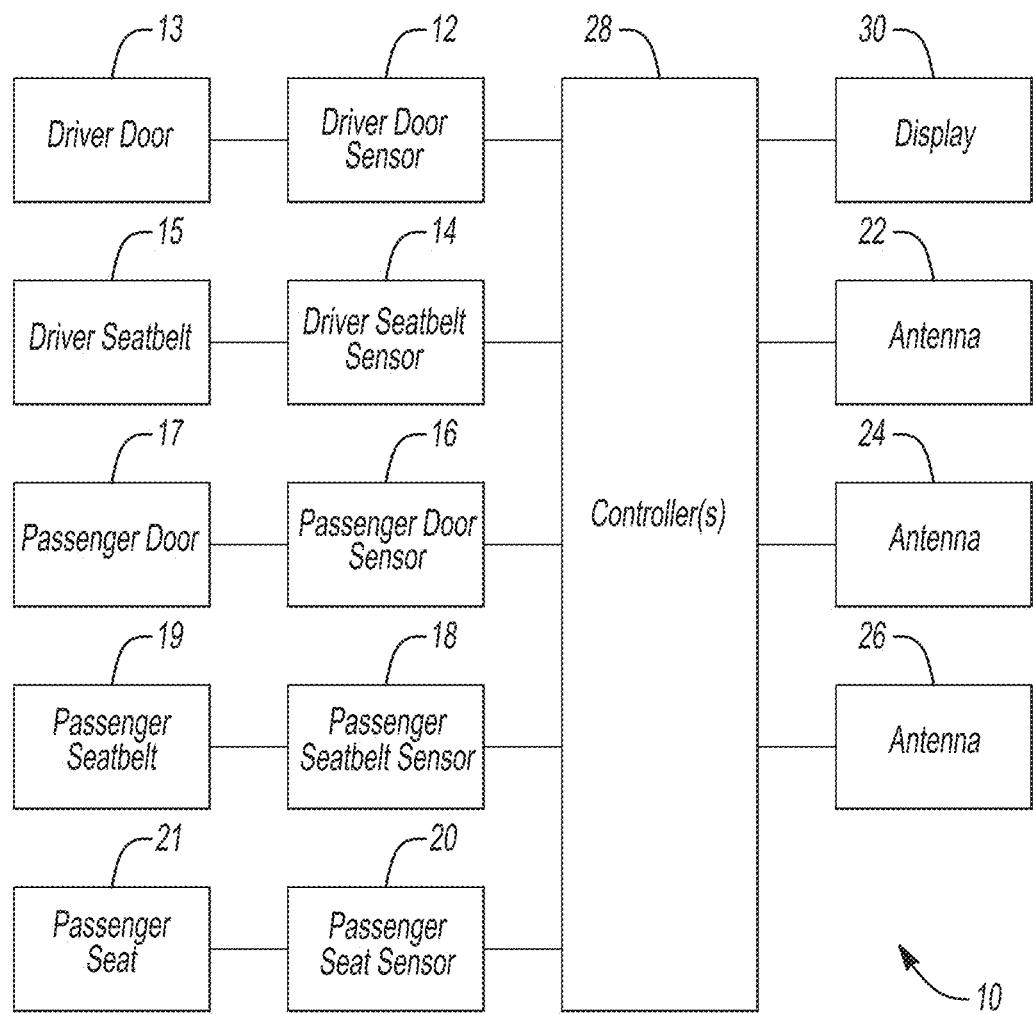
FIG. 1 is a block diagram of portions of a vehicle with a passive entry system.

Embodiments are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one of ordinary skill in the art. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In certain vehicles when the ignition status is in RUN, the body control module may rely on the transition of the driver or front passenger door status from open to closed to trigger a so called passive key fob search, and detect the presence of a fob in the vehicle. This feature may serve to alert the driver if the fob is absent from the vehicle once it has already been authenticated for the key cycle. If the passive key is not detected inside the vehicle, then a NO KEY DETECTED IN RUN message may be displayed on the cluster. This message can alert the driver that the vehicle is running, but they do not have the fob with them. As such, subsequent key authentication efforts may be unsuccessful, which may prevent the vehicle from starting.

For some of these vehicles, the doors can be removed. This may frequently be done for off road vehicles to permit better visibility of obstacles on trails. In this case, the driver may not be able to rely on the door ajar status (because the doors are absent) while the ignition status is RUN for triggering a search for the passive key to detect its presence inside the vehicle. In addition, when the doors are off, there is a chance the passive key may unintentionally fall out of the vehicle. Thus, it may be helpful to search for presence of the passive key when the doors are removed under certain conditions. Also, due to fob battery constraints, it may not be feasible to regularly search for the passive key when the vehicle is being driven with the doors off, since it may impact fob battery life. Here, strategies are proposed to detect the passive key when one or both of the front doors are absent. These strategies define scenarios under which periodic searches and one time searches may be permitted.

A doors off lost passive key search may detect when an already authenticated passive key leaves the vehicle without the driver knowing. For example, as mentioned above, without front driver and/or passenger doors present there is opportunity for the passive key to fall out of the vehicle onto the ground. A combination of seatbelt status and occupant status, in certain examples, can be used to determine presence of a person inside the vehicle, and when the front door is removed the passive key search may be initiated when a transition in seatbelt or occupant status occurs. In some circumstances, occupant status may only be available for the passenger seat, not the driver seat. Therefore, if the driver door is removed, the passive key search may trigger responsive to the driver seatbelt status change. Since occupant status may be present for the passenger seat, priority may be given to the occupant status state change rather than the seatbelt status. If the passenger door is removed, the passive key search may look for any transition in occupant status first, before examining seatbelt status to initiate the passive key search. The passive key search may not require any special hardware interaction or software reconfiguration to transition between doors on and doors off situations. All scenarios, some of which are described in the following paragraphs, may be embedded into passive key search logic.

When the passenger door is removed, and the occupant status indicates a passenger missing, a one-time passive key search may occur. If either of the front doors are present, the passive key search may occur when the front door status transitions from open to closed. If the ignition status is in RUN, the passive key has been authenticated, and there has been no driver activity (e.g., accelerator pedal press, brake pedal press, shifter press, etc.) for a predefined period of time (e.g., 40 seconds, 60 seconds, etc.) or the driver has left the vehicle with the doors off, a secure idle state may be entered. When this state is exited due to driver activity, the passive key search may occur to detect the presence of the passive key in the vehicle. When the vehicle achieves a predetermined speed threshold (e.g., 5 kilometers per hour, 8 kilometers per hour, etc.) the passive key search may occur. This key search occurs once the ignition transitions to RUN or after a periodic, one-time, door ajar, or secure idle search.

Periodic searches may be limited to cases in which the driver seatbelt is unbuckled and the driver door is removed, or there is a fault with certain sensors or modules. If the passive key is found inside the vehicle, then a periodic search may be executed regularly (e.g., every 2 seconds, every 3 seconds, etc.) If the passive key is not detected inside the vehicle, then a periodic search may be executed regularly, but at longer intervals (e.g., every 5 seconds, every 7 seconds, etc.).

On a vehicle with the doors present, the ignition status at RUN or START, the transmission status at PARK, the passive key being present in the vehicle, and the front driver door being open a predetermined period of time (e.g., 2 seconds) or longer, the vehicle will enter secure idle. To exit secure idle, the passive key search occurs to verify the presence of the passive key. When the front doors are removed, it may not be possible to enter secure idle within, for example, 2 seconds of the door being ajar or to exit the passive key search to exit secure idle after the door transitions to ajar. A passive key search, however, should still occur after the 2 seconds to make sure it has not exited the vehicle. Thus, a periodic search occurs every 2 seconds in this example.

On a vehicle with the front doors absent, the ignition status at RUN, and the driver exiting the vehicle, secure idle may immediately be entered because the passive key search will return invalid. A periodic passive key search, however, may still need to occur to detect a valid key returning to the vehicle so that secure idle can be exited.

On a vehicle with the front doors present and the ignition in RUN, if the driver exits the vehicle with the passive key and shuts all the doors, then an external horn honk may sound to indicate secure idle has been activated. On a vehicle with the front doors absent, there is an increased chance of such an action being performed frequently. Therefore, to reduce possible annoyance, such external horn honks may be eliminated.

Periodic passive key searching may end once the driver is belted, the driver door is re-attached, or the vehicle reaches a speed greater than a predetermined threshold (e.g., 5 kilometers per hour), and a driveaway passive key search is performed. For automatic transmission vehicles, periodic passive key searches may only be performed when the vehicle is in park. This may avoid battery usage scenarios due to constant polling when the vehicle is driven below a particular speed threshold (e.g., 5 kilometers per hour) for an extended period while the driver is unbelted and the driver door is removed. This strategy may not be implemented on manual transmission vehicles, since there may be no dedicated PARK state available. Therefore, manual transmission vehicles may experience periodic passive key searches whenever the vehicle is driven below, for example, 5 kilometers per hour, with the driver unbelted and the driver door absent.

The following table describes various circumstances for which a passive fob search may be initiated:

| Passenger Seatbelt Status | Driver Seatbelt Status | Passenger Seat Sensor | Passenger Door Status | Driver Door Status | Passive Key Search | Notes |
|---|---|---|---|---|---|---|
| N/A | N/A | N/A | PRESENT | PRESENT | ONE TIME | (i) |
| N/A | BELTED | OCCUPIED | N/A | N/A | NONE | (ii) |
| N/A | UNBELTED | OCCUPIED | NOT PRESENT | PRESENT | ONE TIME | (iii) |
| N/A | UNBELTED | EMPTY | PRESENT | NOT PRESENT | PERIODIC | (iv) |
| BELTED | BELTED | EMPTY | NOT PRESENT | N/A | ONE TIME | (v) |
| UNBELTED | BELTED | EMPTY | NOT PRESENT | PRESENT | ONE TIME | (vi) |
| N/A | UNBELTED | EMPTY | NOT PRESENT | PRESENT | ONE TIME | (vii) |
| N/A | UNBELTED | N/A | N/A | NOT PRESENT | PERIODIC | (viii) |
| UNBELTED | BELTED | EMPTY | NOT PRESENT | NOT PRESENT | ONE TIME | (ix) |

(i) If the doors are present, a passive key search may be performed if at least one of the driver or passenger door transitions from open to closed.

(ii) Both the passenger and driver are present. Unless some other trigger condition occurs, no passive key search will be performed.

(iii) The passenger is present, the driver door is present, but the driver may not be present. A door ajar passive key search can be performed to determine if the driver has taken the key. If the passenger seat is empty, then a one-time search can be triggered.

(iv) The passenger is not present, the driver door is absent, and the driver is present. If the driver unbuckles, a periodic passive key search is initiated. If the passenger enters, a door ajar passive key search is initiated.

(v) The driver and driver door are present. The passenger door is not present. The passenger belt sensor shows BELTED, but the passenger seat sensor shows EMPTY. This is possible if the passenger is sitting on top of a belted seat and gets out of the vehicle. Therefore, a one-time passive key search is performed.

(vi) The passenger is unbelted and not in their seat. The driver door is present, but the passenger door is not present. Therefore, it is possible that the passenger left with the key. A one-time passive key search is thus performed.

(vii) The driver is unbelted, the driver door is present, the passenger door is not present, and the passenger seat sensor shows EMPTY. It is possible that there is no passenger in the vehicle and the driver could exit the vehicle via the passenger door. Therefore, a one-time search is performed.

(viii) The Driver is unbelted and the driver door is not present. A periodic passive key search is therefore performed.

(ix) The driver is belted, but the passenger is unbelted. The passenger seat sensor shows EMPTY. The driver and passenger doors are not present. Under these conditions, the passenger could have left with the key: A one-time search is performed.

If there is a fault in any of the sensors mentioned, the system may default to periodic search passive key searching. Also, a one-time passive key search may be performed when the passenger is belted and the passenger seat sensor show EMPTY because it is possible the passenger may be sitting on top of a buckled seatbelt. The same may occur on the driver's side. But since there may not be a driver seat sensor, it may not be possible to detect if the driver is in their seat or not. A periodic passive key search could be performed whenever the driver door is off, but this may impact fob battery life.

Referring to FIG. 1, a vehicle 10 may include a driver door sensor 12, a driver seatbelt sensor 14, a passenger door sensor 16, a passenger seatbelt sensor 18, a passenger seat sensor 20, antennas (transceivers) 22, 24, 26, one or more controllers 28, and a display 30. The vehicle 10 further includes a driver door 13, a driver seatbelt 15, a passenger door 17, a passenger seatbelt 19, and a passenger seat 21. The controllers 28 are in communication with each of the elements connected therewith via standard networking technology (e.g., a controller area network, Ethernet, etc.) The driver door and passenger door sensors 12, 16 detect whether the respective doors 13, 17 are ajar, absent, or present. The driver seatbelt and passenger seatbelt sensors 14, 18 detect whether the respective seatbelts 15, 19 are buckled or unbuckled. The passenger seat sensor 20 detects whether the passenger seat 21 is occupied. The sensors shown are configured in known fashion to perform their functions: They may continually or periodically collect data in a contact or contactless manner and communicate such to the controllers 28. Responsive to such data, the controllers 28 may command that a one-time or periodic passive key search be performed, and output corresponding information via the display 30 to alert the driver as to the results thereof.

As an example, responsive to the driver door sensor 12 indicating that the driver door 13 is PRESENT, the passenger door sensor 16 indicating that the passenger door 17 is NOT PRESENT, the driver seatbelt sensor 14 indicating that the driver seatbelt 15 is BELTED, the passenger seatbelt sensor 18 indicating the passenger seatbelt 19 is UNBELTED, and the passenger seat sensor 20 indicating that the passenger seat 21 is EMPTY, the controllers 28 may command the antennas 22, 24, 26 to each in a predetermined sequence output a low frequency signal. If no high frequency signal is received back from a recognized fob or the high frequency signal received back from a recognized fob is indicative of the fob being outside the vehicle 10, the controllers 28 may output data for the display 30 indicating that the fob is no longer in the vehicle 10. Other scenarios, such as those summarized in the table above, are also contemplated.

Figure 2:
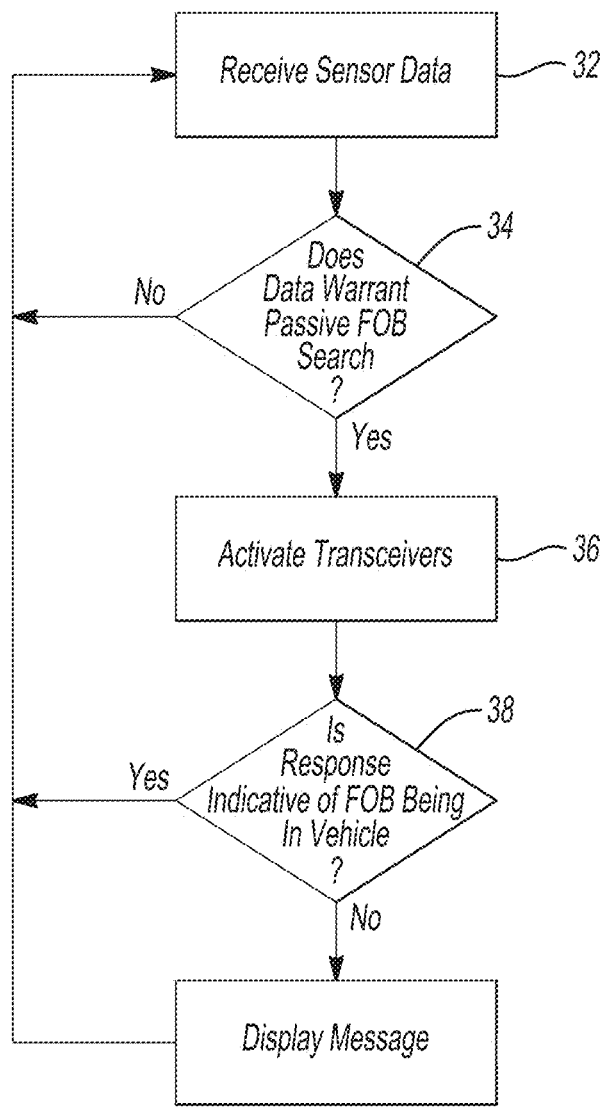
FIG. 2 is a flow chart of an algorithm for operating the passive entry system of FIG. 1.

Referring to FIG. 2, sensor data is received at operation 32. This may include door, seat, and seatbelt status data. At operation 34, it is determined whether the data warrants a passive fob search. If the data, for example, satisfies the conditions listed in the fifth row of the table above, a passive fob search may be warranted. If the data satisfies the conditions listed in the second row of the table above, a passive fob search may not be warranted, etc. If no, the algorithm returns to operation 32. If yes, transceivers are activated at operation 36. The transceivers may sequentially generate a radio frequency signal for reception by any fob in a vicinity of the vehicle. At operation 38, it is determined if the response is indicative of the fob being in the vehicle. Absence of any return signals to the transceivers being activated, for example, may indicate that the fob is not in the vehicle. If yes, the algorithm returns to operation 32. If no, a message is displayed indicating the fob is not in the vehicle.

Representative control strategies and/or logic are described that may be implemented using one or more processing strategies such as event-driven, interrupt-driven, multi-tasking, multi-threading, state-driven, and the like. As such, various steps or functions illustrated may be performed in the sequence described, in parallel, or in some cases omitted. Although not always explicitly illustrated, one of ordinary skill in the art will recognize that one or more of the contemplated steps or functions may be repeatedly performed depending upon the particular processing strategy being used. Similarly, the order of processing is not necessarily required to achieve the features and advantages described herein, but is provided for ease of illustration and description.

The processes, methods, or algorithms disclosed herein can be deliverable to/implemented by a processing device, controller, or computer, such as the controller 28, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, case of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   one or more sensors configured to detect whether a seat of the vehicle is occupied and whether a door of the vehicle is absent;
   one or more transceivers; and
   one or more controllers programmed to, responsive to data from the one or more sensors indicating the seat is not occupied and the door is absent, command the one or more transceivers to output radio frequency signals such that the one or more transceivers output the radio frequency signals.

2. The vehicle of claim 1, wherein the one or more controllers are further programmed to, responsive to an absence of any return signal to the radio frequency signals, generate data for display indicating a key fob is not located in the vehicle.

3. The vehicle of claim 1, wherein the one or more controllers are further programmed to command the transceivers to output radio frequency signals at predetermined periodic instances of time.

4. The vehicle of claim 1, wherein the one or more sensors include a seatbelt sensor.

5. The vehicle of claim 1, wherein the one or more sensors include a door sensor.

6. The vehicle of claim 5, wherein the door sensor is a driver door sensor.

7. The vehicle of claim 5, wherein the door sensor is a passenger door sensor.

8. A method comprising:
   responsive to detecting a seat of a vehicle is not occupied and a door of the vehicle is absent, outputting radio frequency signals; and
   responsive to detecting an absence of any return signal to the radio frequency signals, generating data indicating a key fob is not located in the vehicle.

9. The method of claim 8 further comprising outputting the radio frequency signals at predetermined periodic instances of time.

* * * * *